US010977138B1

(12) United States Patent
Behera et al.

(10) Patent No.: US 10,977,138 B1
(45) Date of Patent: Apr. 13, 2021

(54) METHOD AND SYSTEM FOR EFFICIENTLY HANDLING BACKUP DISCOVERY OPERATIONS

(71) Applicant: EMC IP Holding Company LLC, Hopkinton, MA (US)

(72) Inventors: Amarendra Behera, Bangalore (IN); Gururaj Soma, Bangalore (IN); Himanshu Arora, Bangalore (IN); Shelesh Chopra, Bangalore (IN); Tushar B. Dethe, Bangalore (IN); Vipin Kumar Kaushal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 16/673,307

(22) Filed: Nov. 4, 2019

(51) Int. Cl.
*G06F 11/14* (2006.01)
(52) U.S. Cl.
CPC ...... *G06F 11/1474* (2013.01); *G06F 11/1435* (2013.01); *G06F 11/1451* (2013.01); *G06F 11/1464* (2013.01); *G06F 11/1469* (2013.01)
(58) Field of Classification Search
CPC ............. G06F 11/1474; G06F 11/1451; G06F 11/1464; G06F 11/1469; G06F 11/1435
USPC ......................................................... 711/162
See application file for complete search history.

(56) References Cited

U.S. PATENT DOCUMENTS 10,241,870 B1 * 3/2019 Beatty .................... G06F 16/903
2020/0192899 A1 * 6/2020 Joshi ................. G06F 16/24539

* cited by examiner

*Primary Examiner* — David Yi
*Assistant Examiner* — Zubair Ahmed
(74) *Attorney, Agent, or Firm* — Chamberlain, Hrdlicka, White, Williams & Aughtry

(57) ABSTRACT

A method and system for efficiently handling backup discovery operations. Specifically, the disclosed method and system entail enhancing breadcrumbs—e.g., persistent files that store status and other metadata information respective to performed asset backup operations—to further include unique transaction identifiers. These transaction identifiers may serve as markers for distinguishing which subset of breadcrumbs (rather than all breadcrumbs) to forward to a central management system during asset backup discovery operations. The disclosed method and system also implement batch processing architecture to regulate resource consumption on both the client and manager sides.

20 Claims, 8 Drawing Sheets

METHOD AND SYSTEM FOR EFFICIENTLY HANDLING BACKUP DISCOVERY OPERATIONS

BACKGROUND

Regarding backup operation management, backup discovery requests are often issued to ascertain the status of data backups that may have been requested earlier. In response to the backup discovery requests, backup metadata descriptive of the data backups may be returned.

SUMMARY

In general, in one aspect, the invention relates to a method for handling backup discovery operations, comprising: receiving, from a client device manager, a first backup discovery request comprising a first last transaction identifier and a first breadcrumb paging value; identifying, based on the first last transaction identifier, a first breadcrumb object set comprising a first plurality of breadcrumb objects; partitioning, based on the first breadcrumb paging value, the first breadcrumb object set to obtain a first breadcrumb object subset comprising a portion of the first plurality of breadcrumb objects; generating a first discovery batch response comprising backup operation metadata retrieved from the first breadcrumb object subset; and transmitting, in response to the first backup discovery request, the first discovery batch response to the client device manager.

In general, in one aspect, the invention relates to A non-transitory computer readable medium (CRM) comprising computer readable program code, which when executed by a computer processor, enables the computer processor to: receive, from a client device manager, a first backup discovery request comprising a first last transaction identifier and a first breadcrumb paging value; identify, based on the first last transaction identifier, a first breadcrumb object set comprising a first plurality of breadcrumb objects; partition, based on the first breadcrumb paging value, the first breadcrumb object set to obtain a first breadcrumb object subset comprising a portion of the first plurality of breadcrumb objects; generate a first discovery batch response comprising backup operation metadata retrieved from the first breadcrumb object subset; and transmit, in response to the first backup discovery request, the first discovery batch response to the client device manager.

In general, in one aspect, the invention relates to a system, comprising a client device manager comprising a first computer processor; a client device operatively connected to the client device manager and comprising a second computer processor; and a backup agent executing on the second computer processor and maintaining at least a plurality of breadcrumb objects, wherein the backup agent is programmed to: receive, from the client device manager, a backup discovery request comprising a last transaction identifier and a breadcrumb paging value; identify, based on the last transaction identifier, a breadcrumb object set comprising the plurality of breadcrumb objects; partition, based on the breadcrumb paging value, the breadcrumb object set to obtain a breadcrumb object subset comprising a portion of the plurality of breadcrumb objects; generate a discovery batch response comprising backup operation metadata retrieved from the breadcrumb object subset; and transmit, in response to the backup discovery request, the discovery batch response to the client device manager.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for efficiently handling backup discovery operations. Specifically, one or more embodiments of the invention entails enhancing breadcrumbs—e.g., persistent files that store status and other metadata information respective to performed asset backup operations—to further include unique transaction identifiers. These transaction identifiers may serve as markers for distinguishing which subset of breadcrumbs (rather than all breadcrumbs) to forward to a central management system during asset backup discovery operations. One or more embodiments of the invention also implement(s) batch processing architecture to regulate resource consumption on both the client and manager sides.

Figure 1A:
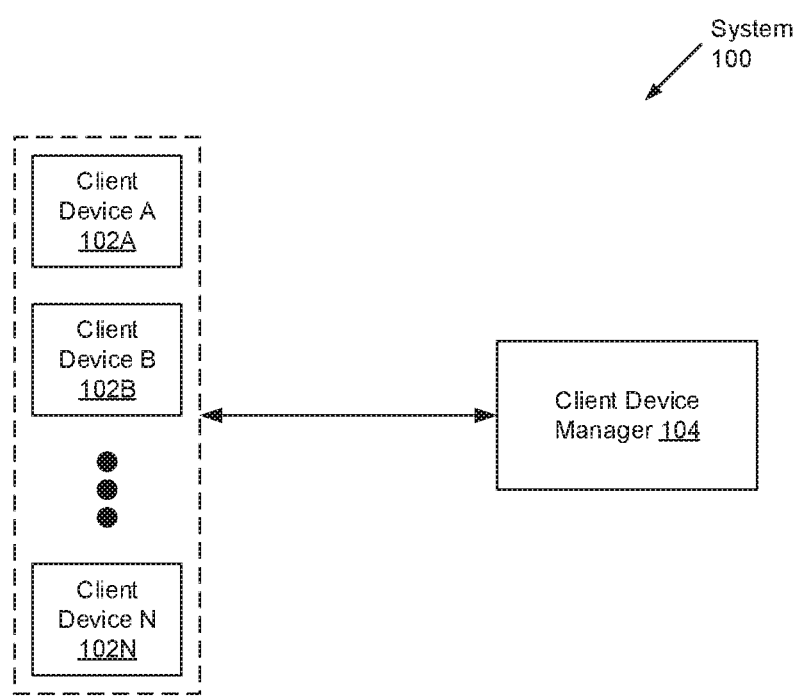
FIG. 1A shows a system in accordance with one or more embodiments of the invention.

FIG. 1A shows a system in accordance with one or more embodiments of the invention. The system (100) may include one or more client devices (102A-102N) and a client device manager (104). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical computing system designed and configured to receive, generate, process, store, and/or transmit data, as well as to provide an environment in which one or more computer programs (not shown) may execute thereon. The computer program(s) may, for example, implement large-scale and complex data processing; or implement one or more services offered locally or over the network. Further, in providing an execution environment for the computer program(s) installed thereon, a client device (102A-102N) may include and allocate various resources (e.g., computer processors, memory, storage, virtualization, network bandwidth, etc.), as needed, to the computer program(s) and the task(s) (process(es)) instantiated thereby. One of ordinary skill will appreciate that a client device (102A-102N) may perform other functionalities without departing from the scope of the invention. Examples of a client device (102A-102N) may include, but are not limited to, a desktop computer, a workstation computer, a server, a mainframe, or any other computing system similar to the exemplary computing system shown in FIG. 4. Moreover, any client device (102A-102N) is described in further detail below with respect to FIG. 1B.

In one embodiment of the invention, the client device manager (104) may represent a monitoring and management system, which may at least be responsible for centralizing client device (102A-102N) administration and/or operations. To that extent, the client device manager (104) may include functionality to: issue asset backup operation requests to the client device(s) (102A-102N); issue asset backup discovery requests to the client device(s) (102A-102N); and receive asset backup operation metadata from the client device(s) (102A-102N) in response to the issued asset backup discovery requests. One of ordinary skill will appreciate that the client device manager (102) may perform other functionalities without departing from the scope of the invention.

In one embodiment of the invention, the client device manager (104) may be implemented using one or more servers (not shown). Each server may reflect a physical server that may reside in a datacenter, or a virtual server that may reside in a cloud computing environment. Additionally or alternatively, the client device manager (104) may be implemented using one or more computing systems similar to the exemplary computing system shown in FIG. 4. Moreover, the client device manager (104) is described in further detail below with respect to FIG. 1C.

While FIG. 1A shows a configuration of components, other system (100) configurations may be used without departing from the scope of the invention.

Figure 1B:
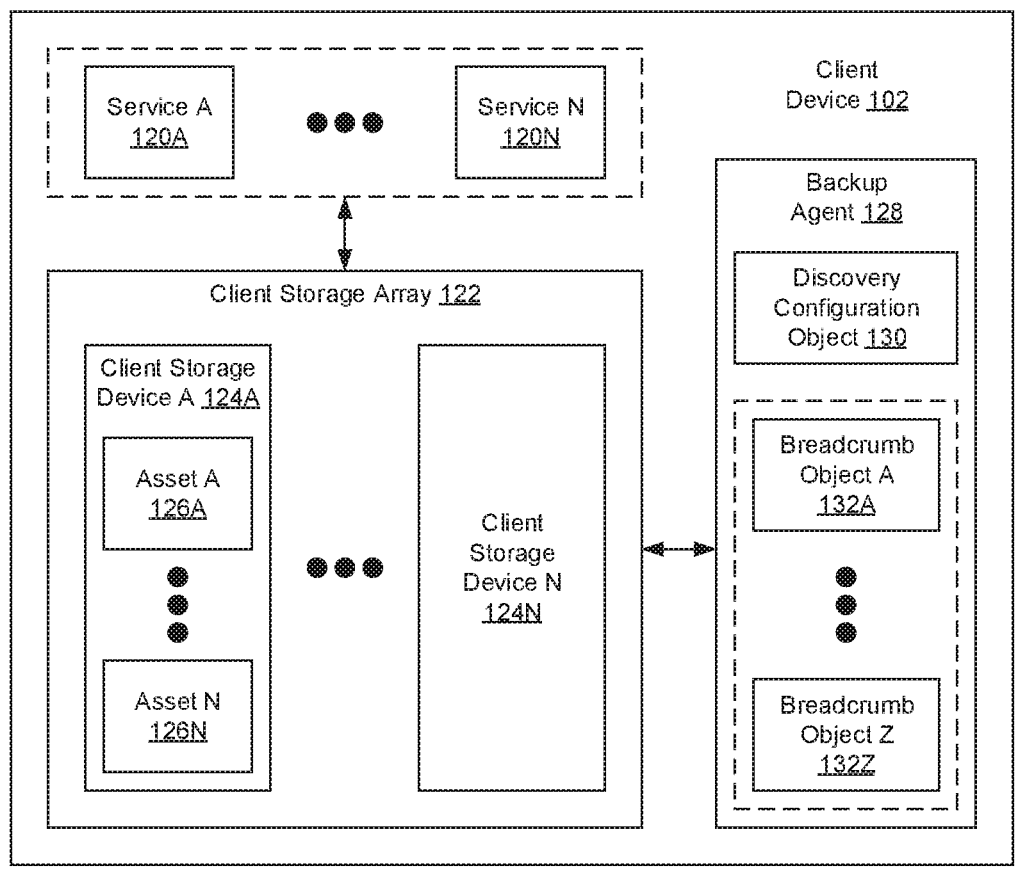
FIG. 1B shows a client device in accordance with one or more embodiments of the invention.

FIG. 1B shows a client device in accordance with one or more embodiments of the invention. The client device (102) may include one or more services (120A-120N), a client storage array (122), and a backup agent (128). Each of these client device (102) subcomponents is described below.

In one embodiment of the invention, a service (120A-120N) may represent a database management system instance (e.g., a computer program), which may execute on the underlying hardware of the client device (102) as an operating system service. Each service (120A-120N) may manage one or more databases (also referred to as assets), which may maintain both system-pertinent and user-defined information and metadata. Further, any given service (120A-120N) may include functionality to enable client device (102) users to store and query data across the asset(s) respective to the given service (120A-120N). One of ordinary skill will appreciate that a service (120A-120N) may perform other functionalities without departing from the scope of the invention.

In one embodiment of the invention, the client storage array (122) may refer to physical data storage across which various forms of data—e.g., one or more assets (126A-126N) (described below)—may be maintained. The client storage array (122) may be implemented using one or more client storage devices (124A-124N). Each client storage device (124A-124N) may encompass non-transitory computer readable storage media on which data may be stored in whole or in part, and temporarily or permanently. Further, each client storage device (124A-124N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (142) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (126A-126N) may represent a database, or a logical container to and from which related data may be stored and retrieved, respectively. An asset (126A-126N) may occupy a portion of a client storage device (124A-124N) or, alternatively, may span across multiple client storage devices (124A-124N), of the client storage array (122). Furthermore, an asset (126A-126N) may refer to a composite of various database objects (not shown) including, but not limited to, one or more data files, one or more control files, and one or more redo log files.

In one embodiment of the invention, a data file may refer to a database object for storing database data. Database data may encompass computer readable content (e.g., images, text, video, audio, machine code, any other form of computer readable content, or a combination thereof). A control file may refer to a database object for storing asset (126A-126N) metadata (also referred to as database metadata). Database metadata may encompass information descriptive of the database (or asset (126A-126N)) status and structure. By way of examples, database metadata may include, but are not limited to, a database name assigned to the asset (126A-126N), the name(s) and storage location(s) of one or more data files and redo log files associated with the asset (126A-126N), a creation timestamp encoding the date and/or time marking the creation of the asset (126A-126N), a log sequence number associated with a current redo log file, etc. Moreover, a redo log file may refer to a database object for storing a history of changes made to the database data. A redo log file may include one or more redo entries (or redo records), which may include a set of change vectors. Each change vector subsequently describes or represents a modification made to a single asset (126A-126N) data block. Furthermore, a redo log file may serve to recover the asset (126A-126N) should a failover occur, or to apply recent changes to a recovered asset (126A-126N) which may have transpired during the database recovery process.

In one embodiment of the invention, the backup agent (128) may refer to a computer program that may execute on the underlying hardware of the client device (102). Specifically, the backup agent (128) may be designed and configured to facilitate backup discovery operations—i.e., tasks directed to discovering the status of one or more asset backup operations instantiated on the client device (102). To that extent, the backup agent (128) may perform the various steps outlined below with respect to FIGS. 2A and 2B, which may be directed to the efficient client-side handling of the aforementioned backup discovery operations. One of ordinary skill will appreciate that the backup agent (128) may perform other functionalities without departing from the scope of the invention.

In one embodiment of the invention, in facilitating backup discovery operations, the backup agent (128) may maintain and/or access a discovery configuration object (130), which may be stored in memory (not shown) or in the client storage array (122). The discovery configuration object (130) may refer to a data object (e.g., a data file, a data structure, or a composite data variable) used for storing configuration metadata descriptive of the overall backup discovery process. By way of examples, the aforementioned configuration metadata may include, but is not limited to, a breadcrumb paging value and a last-delivered transaction identifier. The breadcrumb paging value may refer to a numerical value (e.g., an integer) that reflects a breadcrumb batch size limit, or a maximum number of breadcrumb objects (described below) permitted to be processed and/or delivered to the client device manager (104) at any given time. Meanwhile, the last-delivered transaction identifier may refer to a numerical value (e.g., an integer) assigned to, and therefore uniquely identifies, a last asset backup operation for which associated backup operation metadata had been delivered to the client device manager (104) during an earlier or current backup discovery operation.

In one embodiment of the invention, in facilitating backup discovery operations, the backup agent (128) may further maintain and/or access one or more breadcrumb objects (132A-132Z). A breadcrumb object (132A-132Z) may refer to a data object (e.g., a data file, a data structure, or a composite data variable) that results from performing (or rather, attempting to perform) any given asset backup operation targeting any given asset (126A-126N). Accordingly, a breadcrumb object (132A-132Z), produced by or during a given asset backup operation, may store backup operation metadata descriptive of the given asset backup operation. By way of examples, the aforementioned backup operation metadata may include, but is not limited to, a transaction identifier assigned to uniquely identify the given asset backup operation, a status label indicating a status of the given asset backup operation (e.g., in-progress, successfully completed, failed, etc.), a failure reason description detailing the reason(s) for a failed asset backup operation (if applicable), target backup device information (e.g., backup device hostname, backup device credentials, etc.), backup saveset time, log sequence numbers, type of backup performed and name of backup saveset, etc.

In one embodiment of the invention, the above-mentioned transaction identifiers may be generated and allocated (or assigned) in ascending order. That is, for a series of asset backup operations ($O_1, O_2, O_3, \ldots, O_N$) instigated in chronological order ($T_1, T_2, T_3, \ldots, T_N$) on a given client device (102A-102N), a transaction identifier (ID) assigned to each successive asset backup operation may reflect a greater numerical value than the previously assigned transaction identifier for a previously instigated asset backup operation—i.e., $ID_1 < ID_2 < ID_3 < \ldots < ID_N$.

While FIG. 1B shows a configuration of components, other client device (102) configurations may be used without departing from the scope of the invention.

Figure 1C:
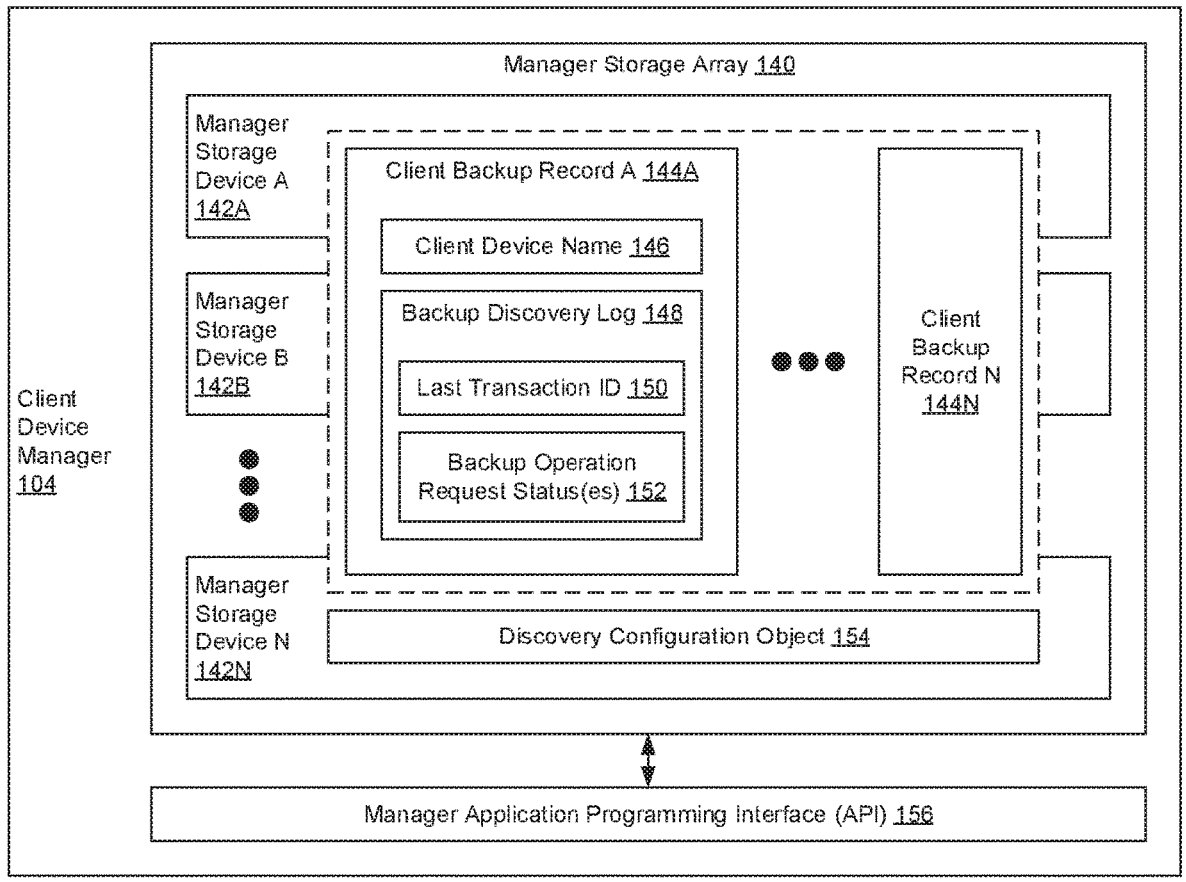
FIG. 1C shows a client device manager in accordance with one or more embodiments of the invention.

FIG. 1C shows a client device manager in accordance with one or more embodiments of the invention. The client device manager (104) may include a manager storage array (140) and a manager application programming interface (API) (156). Each of these client device manager (104) components is described below.

In one embodiment of the invention, the manager storage array (140) may refer to physical data storage across which various forms of data—e.g., one or more client backup records (144A-144N) and a discovery configuration object (154) (described below)—may be maintained. The manager storage array (140) may be implemented using one or more manager storage devices (142A-142N). Each manager storage device (142A-142N) may encompass non-transitory computer readable storage media on which data may be stored in whole or in part, and temporarily or permanently. Further, each manager storage device (142A-142N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the manager storage array (140) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a client backup record (144A-144N) may refer to a data object (e.g., a data file, a data structure, or a composite data variable) used for tracking backup discovery information descriptive of one or more backup operations requested to be performed. Each client backup record (144A-144N) may pertain to a given client device (102A-102N) and, accordingly, may include a client device name (146) specified therein. The client device name (146) may refer to a character string (e.g., a sequence of letters, numbers, symbols, any combination thereof, etc.) assigned to, and subsequently used to uniquely identify, the given client device (102A-102N).

In one embodiment of the invention, each client backup record (144A-144N) may maintain the above-mentioned backup discovery information in a backup discovery log (148). In turn, the backup discovery log (148) may store the backup discovery information, which may take form, for example, as a last transaction identifier (150) and a set of backup operation request statuses (152). The last transaction identifier (150) may refer to a numerical value (e.g., an integer) assigned to, and therefore uniquely identifies, a last asset backup operation (instantiated on the client device (102A-102N) associated with the client device name (146)) for which associated backup operation metadata had been ingested and/or processed by the client device manager (104). Meanwhile, a backup operation request status (152) may refer one or more details (e.g., a status label, reasons for failure (if applicable), target backup device information, etc.) descriptive of a current state of a given backup operation request that may have instigated a backup operation targeting a given asset maintained on the aforementioned client device (102A-102N). Backup discovery information is not limited to the aforementioned examples.

In one embodiment of the invention, the discovery configuration object (154) may refer to a data object (e.g., a data file, a data structure, or a composite data variable) used for storing configuration metadata descriptive of the overall backup discovery process. By way of examples, the aforementioned configuration metadata may include, but is not limited to, a resource-based ingestion flag and a breadcrumb paging value. The resource-based ingestion flag may reference a user-defined parameter, which may reflect a Boolean (i.e., true or false) value indicative of whether the client device manager (104) (or more specifically, the manager API (156)) should limit the ingestion or processing of breadcrumb object backup operation metadata, deliverable by the client device(s) (102A-102N), based on a current utilization or availability of resources (e.g., computer processor(s) and/or memory) on the client device manager (104). Meanwhile, the breadcrumb paging value may refer to a numerical value (e.g., an integer) that reflects a breadcrumb batch size limit, or a maximum number of breadcrumb objects permitted to be ingested and/or processed by the client device manager (104) at any given time (which may be periodically ascertained based on client device manager (104) resource utilization and/or availability at any given time).

In one embodiment of the invention, the manager API (156) may refer to a logical interface or interactivity protocol, which may be designed and configured to facilitate communications between the client device manager (104) and external entities (e.g., the client device(s) (102A-102N)). To that extent, the manager API (156) may include functionality to perform the various steps outlined below with respect to FIGS. 3A and 3B, which may be directed to the efficient server-side handling of backup discovery operations. Further, one of ordinary skill will appreciate that the manager API (156) may perform other functionalities without departing from the scope of the invention.

While FIG. 1C shows a configuration of components, other client device manager (104) configurations may be used without departing from the scope of the invention.

Figure 2A:
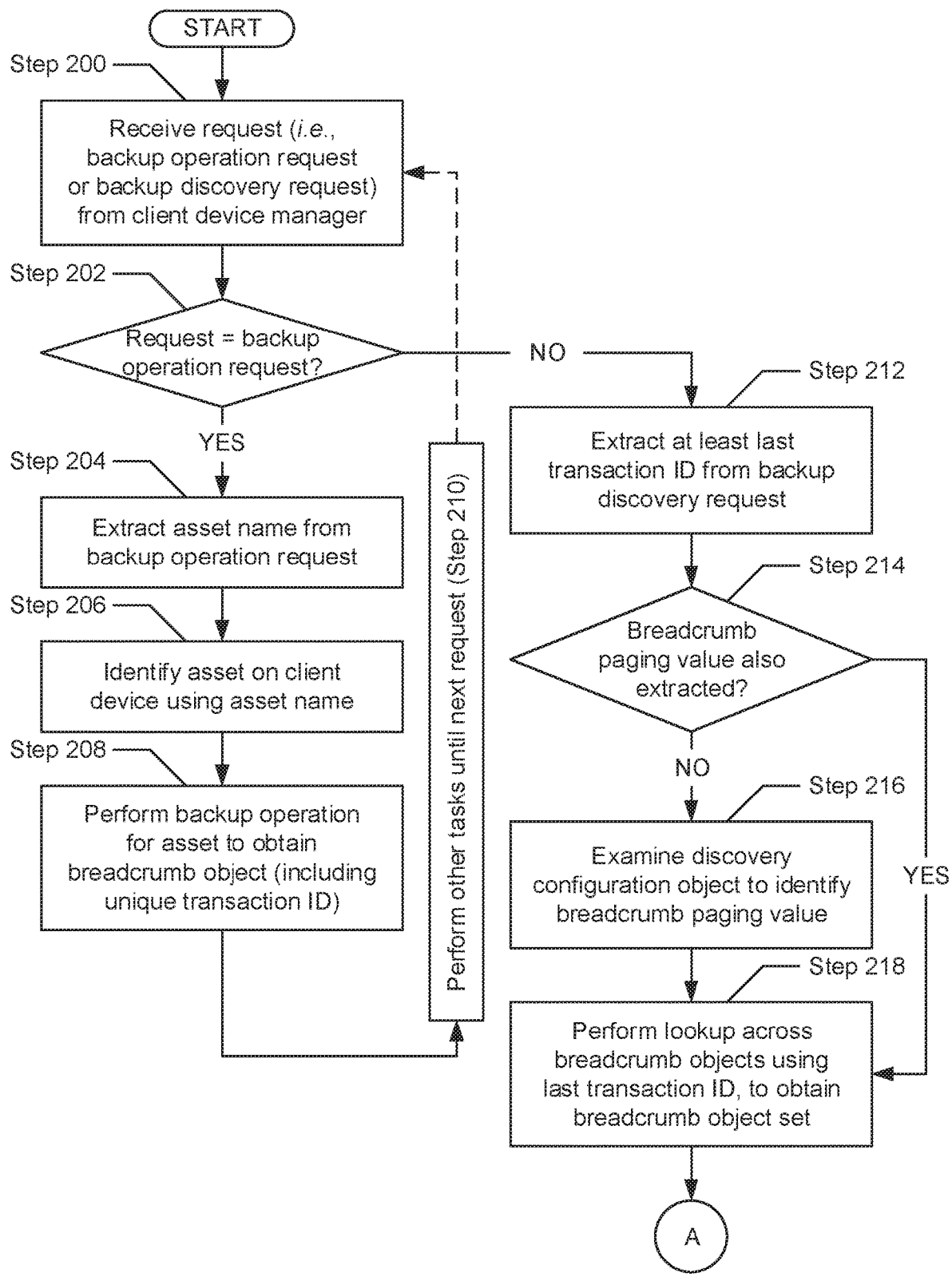
FIGS. 2A and 2B show flowcharts describing a method for efficiently handling backup discovery operations in accordance with one or more embodiments of the invention.
Figure 2B:
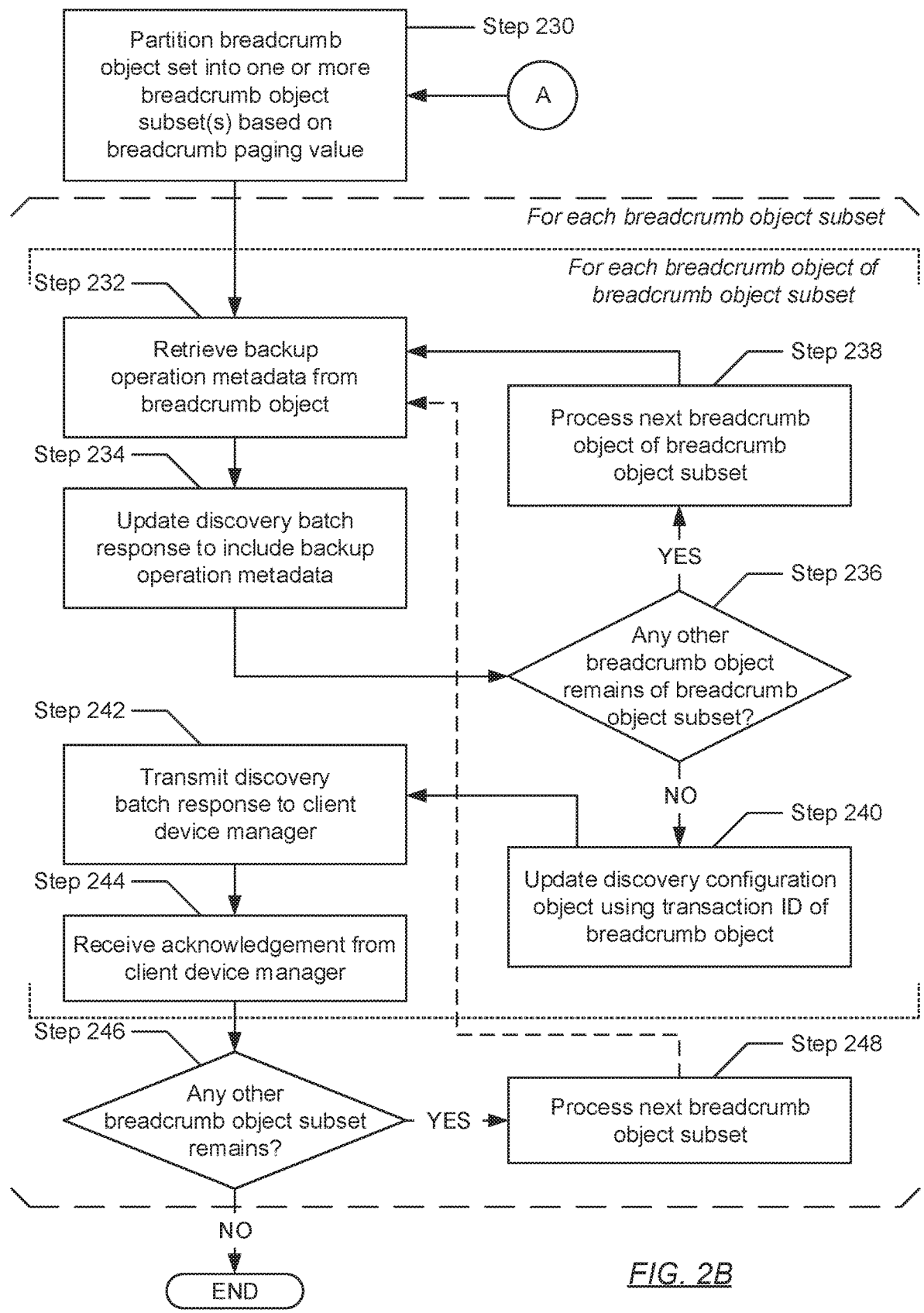

FIGS. 2A and 2B show flowcharts describing a method for efficiently handling backup discovery operations in accordance with one or more embodiments of the invention.

The various steps outlined below may be performed by the backup agent on a client device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, a request is received from the client device manager. In one embodiment of the invention, the request may take form as a backup operation request, which may be directed to carrying out an asset backup operation on the client device. In another embodiment of the invention, the request may alternatively take form as a backup discovery request, which may be directed to carrying out a backup discovery operation, concerning one or more earlier carried out asset backup operations, on the client device.

In Step 202, a determination is made as to whether the request (received in Step 200) is a backup operation request. In one embodiment of the invention, if it is determined that the request is a backup operation request, then the process proceeds to Step 204. On the other hand, in another embodiment of the invention, if it is alternatively determined that the request is a backup discovery request, then the process alternatively proceeds to Step 212.

In Step 204, upon determining (in Step 202) that the request (received in Step 200) is a backup operation request, an asset name is extracted from the request. In one embodiment of the invention, the asset name may uniquely identify an asset maintained on the client device, which may be the target of the asset backup operation. Accordingly, in Step 206, the asset name (extracted in Step 204) is used to identify a given asset on the client device.

In Step 208, an asset backup operation for the given asset (identified in Step 206) is performed. Specifically, in one embodiment of the invention, any granularity of the given asset may be replicated to obtain an asset copy, which may be steered towards a backup storage system for storage. Further, during or following the performance of the asset backup operation, a breadcrumb object (described above) (see e.g., FIG. 1B) may be produced. The breadcrumb object, amongst storing backup operation metadata respective to the performed asset backup operation, may further include a unique transaction identifier assigned to the asset backup operation. Thereafter, in Step 210, other tasks (for which the backup agent on the client device may be responsible) are performed until a next request is received.

In Step 212, upon alternatively determining (in Step 202) that the request (received in Step 200) is a backup discovery request, at least a last transaction identifier is extracted from the request. In one embodiment of the invention, the last transaction identifier may refer to a numerical value (e.g., an integer) assigned to, and therefore uniquely identifies, a last asset backup operation (instigated on the client device) for which associated backup operation metadata had been ingested and/or processed by the client device manager.

In Step 214, a determination is made as to whether the backup discovery request also includes a breadcrumb paging value. The breadcrumb paging value may refer to a numerical value (e.g., an integer) that reflects a breadcrumb batch size limit, or a maximum number of breadcrumb objects permitted to be ingested and/or processed by the client device manager at any given time (which may be periodically ascertained based on client device manager resource utilization and/or availability at any given time). Accordingly, in one embodiment of the invention, if it is determined that the backup discovery request also includes a breadcrumb paging value, then the process proceeds to Step 218. On the other hand, in another embodiment of the invention, if it is alternatively determined that the backup discovery request does not include a breadcrumb paging value, then the process alternatively proceeds to Step 216.

In Step 216, upon determining (in Step 214) that the request (received in Step 200) does not specify a breadcrumb paging value, a discovery configuration object (described above) (see e.g., FIG. 1B) is examined. In one embodiment of the invention, examination of the discovery configuration object may result in the identification of the breadcrumb paging value specified therein. The breadcrumb paging value, specified in the discovery configuration object, may also refer to a numerical value (e.g., an integer) that reflects a breadcrumb batch size limit; however, rather than being defined based on current resource availability on the client device manager, the breadcrumb paging value, specified in the discovery configuration object, may reflect a prescribed numerical value set by a user of the client device.

In Step 218, following the identification of a breadcrumb paging value specified in the discovery configuration object (examined in Step 216) or, alternatively, upon alternatively determining (in Step 214) that the request (received in Step 200) includes a breadcrumb paging value, a lookup is performed across the various breadcrumb objects, maintained on the client device, using the last transaction identifier (extracted in Step 212). In one embodiment of invention, the lookup may result in the identification of a breadcrumb object set, where each breadcrumb object in the breadcrumb object set may be associated with a transaction identifier greater (or having a higher value) than the last transaction identifier. Accordingly, each breadcrumb object in the breadcrumb object set may represent, and subsequently stores, backup operation metadata that has yet to be ingested and/or processed by the client device manager. Furthermore, the breadcrumb object(s) in the breadcrumb object set may retain a transaction identifier (or ascending) order.

Turning to FIG. 2B, in Step 230, the breadcrumb object set (identified in Step 218) is partitioned into one or more breadcrumb object subsets based on the breadcrumb paging value (obtained in Step 214 or Step 216). That is, in one embodiment of the invention, a cardinality of each breadcrumb object subset may be no greater than the breadcrumb batch size limit. For example, consider a scenario where the cardinality of the breadcrumb object set is one thousand and the breadcrumb paging value is one hundred. Accordingly, the breadcrumb object set would be partitioned into ten (i.e., one thousand divided by one hundred) breadcrumb object subsets, each reflecting a cardinality of one hundred breadcrumb objects (i.e., the numerical value defined by the breadcrumb paging value).

Hereinafter, a remainder (i.e., Steps 232 to 248) of the various steps outlined in the present method may be performed for each breadcrumb object subset (obtained in Step 230). For example, had three breadcrumb object subsets been obtained, the aforementioned subset of steps (i.e., Steps 232 to 248) may be traversed a first time for a first breadcrumb object subset, a second time for a second breadcrumb object subset, and a third time for a third breadcrumb object subset. The consideration order of the breadcrumb object subsets may be determined based on an ascending order of the transaction identifiers respective to their first breadcrumb objects—e.g., the transaction identifier assigned to the first breadcrumb object of the first breadcrumb object subset should be less than the transaction identifier assigned to the first breadcrumb object of the second breadcrumb object subset, which the latter in turn should be less than the transaction identifier assigned to the first breadcrumb object of the third breadcrumb object subset.

Furthermore, hereafter, a subset (i.e., Steps 232 to 244) of the above-defined remainder (i.e., Steps 232 to 248) of the various steps outlined in the present method may be performed for each breadcrumb object specified in a given breadcrumb object subset—i.e., a current breadcrumb object subset being considered. That is, by way of an example, if a given breadcrumb object subset includes five breadcrumb objects, then the aforementioned subset of steps (i.e., Steps 232 to 244) may be traversed a first time for a first breadcrumb object, a second time for a second breadcrumb object, a third time for a third breadcrumb object, a fourth time for a fourth breadcrumb object, and a fifth time for a fifth breadcrumb object. The processing order of the breadcrumb objects in a currently considered breadcrumb object subset may be determined based on an ascending order of the transaction identifiers respective to the breadcrumb objects—e.g., the transaction identifier assigned to the first breadcrumb object should be less than the transaction identifier assigned to the second breadcrumb object, which in turn should be less than the transaction identifier assigned to the third breadcrumb object, and so forth.

Accordingly, in Step 232, backup operation metadata (described above) (see e.g., FIG. 1B) is retrieved from a given breadcrumb object (i.e., a current breadcrumb object being processed, of a current breadcrumb object subset being considered). In one embodiment of the invention, the backup operation metadata may refer to information descriptive of a given asset backup operation, from which the given breadcrumb object may have resulted.

In Step 234, a discovery batch response is updated to include the backup operation metadata (retrieved in Step 232). That is, in one embodiment of the invention, the discovery batch response may be initialized using the backup operation metadata should the given breadcrumb object represent a first ordered breadcrumb object processed for the given breadcrumb object subset. In another embodiment of the invention, the discovery batch response may be iteratively updated to include the backup operation metadata should the given breadcrumb object represent any subsequently ordered breadcrumb object processed for the given breadcrumb object subset.

In Step 236, a determination is made as to whether any additional breadcrumb objects remain to be processed, of the given/current breadcrumb object subset being considered. In one embodiment of the invention, if it is determined that at least one other breadcrumb object, of the given/current breadcrumb object subset, remains to be processed, then the process proceeds to Step 238. On the other hand, in another embodiment of the invention, if it is alternatively determined that no additional breadcrumb objects, of the given/current breadcrumb object subset, remains to be processed, then the process alternatively proceeds to Step 240.

In Step 238, upon determining (in Step 236) that at least one other breadcrumb object, of the given/current breadcrumb object subset being considered, remains to be processed, a next breadcrumb object is identified. Subsequently, the process proceeds to (or rather, restarts at) Step 232, where backup operation metadata is retrieved from the next breadcrumb object.

In Step 240, upon alternatively determining (in Step 236) that no additional breadcrumb objects, of the given/current breadcrumb object subset being considered, remains to be processed, the discovery configuration object, maintained on the client device, is updated. Specifically, in one embodiment of the invention, an existing last-delivered transaction identifier (described above) (see e.g., FIG. 1B) specified in the discovery configuration object may be replaced with the transaction identifier unique to the last breadcrumb object being processed, of the given/current breadcrumb object subset being considered.

In Step 242, the discovery batch response (iteratively updated in Step 234 for each breadcrumb object of the given/current breadcrumb object subset) is transmitted towards the client device manager. Following the ingestion and/or processing of the discovery batch response by the client device manager, in Step 244, an acknowledgement is received therefrom.

Thereafter, in Step 246, a determination is made as to whether additional breadcrumb object subsets (obtained in Step 230) remain to be considered. In one embodiment of the invention, if it is determined that at least one other breadcrumb object subset remains to be considered, then the process proceeds to Step 248. On the other hand, in another embodiment of the invention, if it is alternatively determined that no additional breadcrumb object subsets remain to be considered, then the process alternatively ends.

In Step 248, upon determining (in Step 246) that at least one other breadcrumb object subset (obtained in Step 230) remains to be considered, a next breadcrumb object subset is selected. Subsequently, the process proceeds to (or rather, restarts at) Step 232, where backup operation metadata is retrieved from a first breadcrumb object of the next breadcrumb object subset.

Figure 3A:
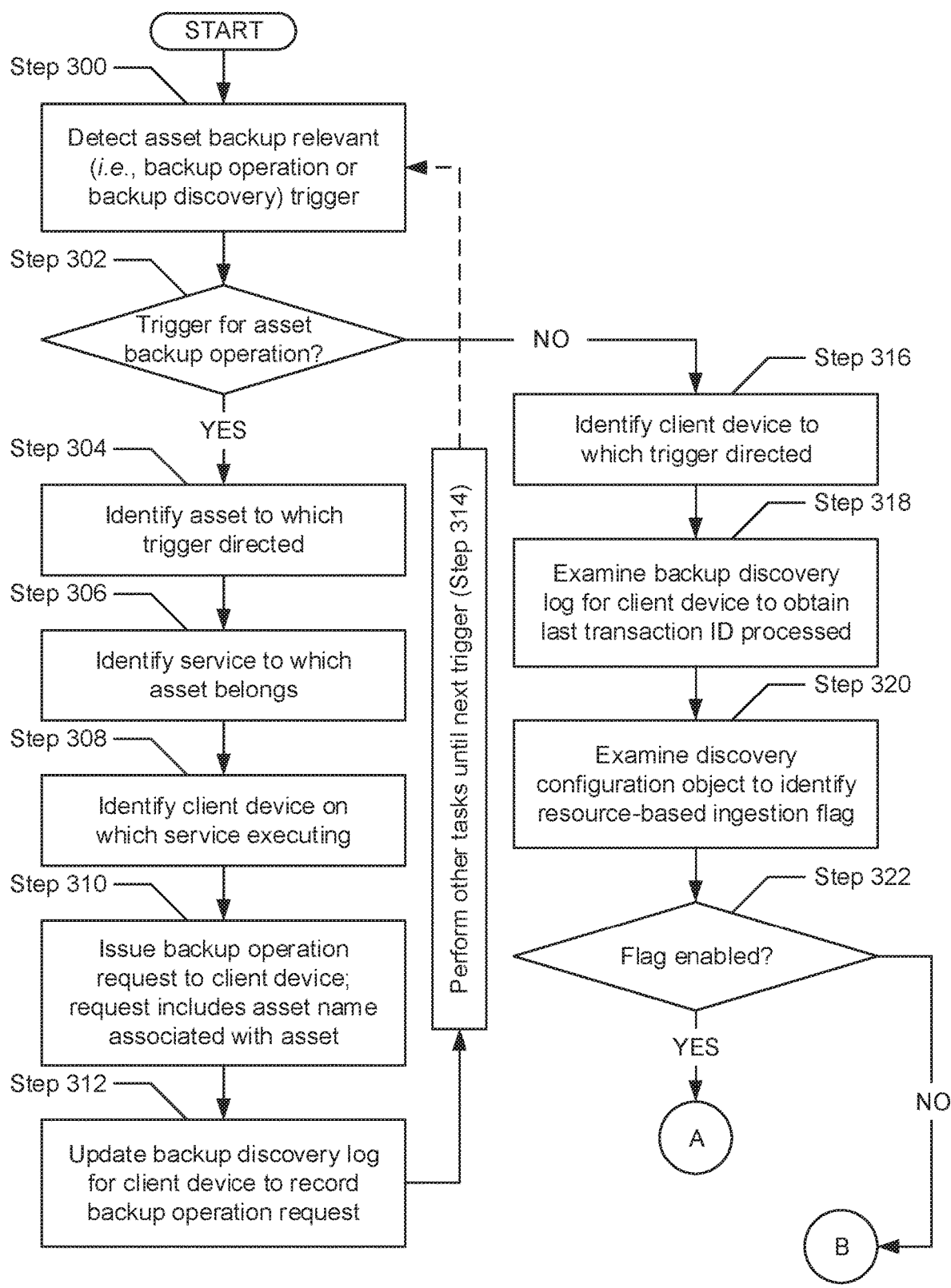
FIGS. 3A and 3B show flowcharts describing a method for efficiently handling backup discovery operations in accordance with one or more embodiments of the invention.
Figure 3B:
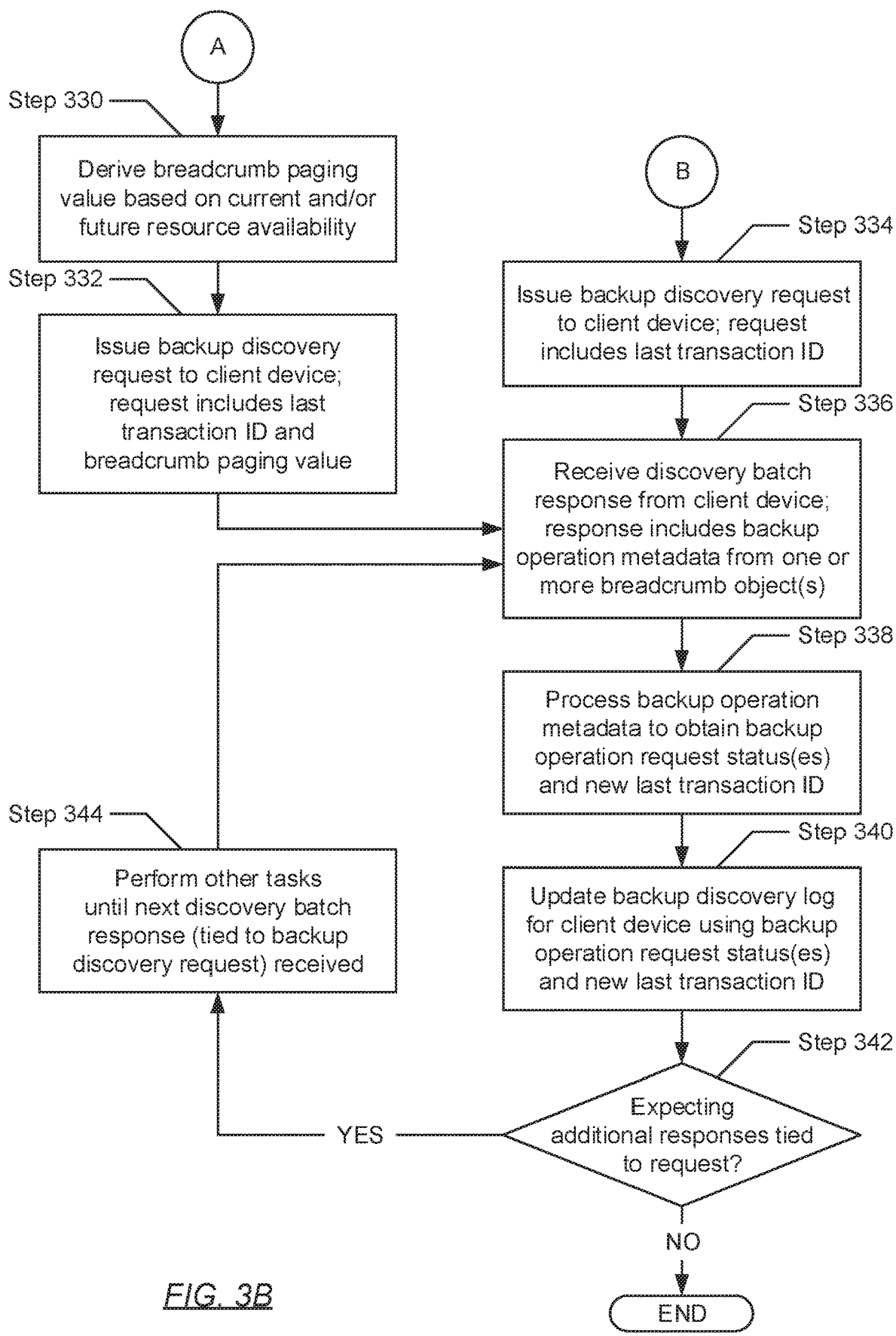

FIGS. 3A and 3B show flowcharts describing a method for efficiently handling backup discovery operations in accordance with one or more embodiments of the invention. The various steps outlined below may be performed by the client device manager (see e.g., FIGS. 1A and 1C). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, an asset backup relevant trigger is detected. In one embodiment of the invention, the asset backup relevant trigger may either manifest as a backup operation trigger or a backup discovery trigger. A backup operation trigger may refer to an event that may initiate an asset backup operation targeting a given asset on a client device and, accordingly, may disclose an asset name associated with the given asset. The asset name may refer to a character string (e.g., a sequence of letters, numbers, symbols, any combination thereof, etc.) assigned to, and subsequently used to uniquely identify, the given asset. Meanwhile, a backup discovery trigger may refer to an event that may initiate a backup discovery operation directed to a given client device and, accordingly, may disclose a client device name associated with the given client device. The client device name may refer to a character string assigned to, and subsequently used to uniquely identify, the given client device.

In Step 302, a determination is made as to whether the asset backup relevant trigger (detected in Step 300) is a backup operation trigger. In one embodiment of the invention, if it is determined that the asset backup relevant trigger has manifested as a backup operation trigger, then the process proceeds to Step 304. On the other hand, in another embodiment of the invention, if it is alternatively determined that the asset backup relevant trigger has manifested as a backup discovery trigger, then the process alternatively proceeds to Step 316.

In Step 304, upon determining (in Step 302) that a backup operation trigger has been detected, a given asset (i.e., database), to which the backup operation trigger is directed, is identified. Specifically, in one embodiment of the invention, the above-mentioned asset name, disclosed by the backup operation trigger, may be used to identify the given asset.

In Step 306, a given service (described above) (see e.g., FIG. 1B), to which the given asset (identified in Step 304) belongs, is identified. Specifically, in one embodiment of the invention, maintained mappings, conveying associative relationships between services and their respective assets, may be used to connect the given asset to the given service.

In Step 308, a given client device, on which the given service (identified in Step 306) is executing, is identified. Specifically, in one embodiment of the invention, maintained mappings, conveying associative relationships between client devices and the respective service(s) executing thereon, may be used to connect the given service to the given client device.

In Step 310, a backup operation request is issued. In one embodiment of the invention, the backup operation request may be directed to the given client device (identified in Step 308) and may include the above-mentioned asset name associated with the given asset (identified in Step 304). Further, the backup operation request may pertain to instigating an asset backup operation on the given client device that targets the given asset.

In Step 312, a backup discovery log, for the given client device (identified in Step 308), is identified and updated. In one embodiment of the invention, the backup discovery log (described above) (see e.g., FIG. 1C) may be maintained in a client backup record for the given client device, which may be identified using a client device name associated with the given client device. Further, updating the backup discovery log may entail appending a new backup operation request status, for the backup operation request (issued in Step 310), to an existing set of backup operation request statuses specified therein. Thereafter, in Step 314, other tasks (for which the client device manager may be responsible) are performed until a next asset backup relevant trigger is detected.

In Step 316, upon alternatively determining (in Step 302) that a backup discovery trigger has been detected, a given client device, to which the backup discovery trigger is directed, is identified. Specifically, in one embodiment of the invention, the above-mentioned client device name, disclosed by the backup discovery trigger, may be used to identify the given client device.

In Step 318, a backup discovery log, for the given client device (identified in step 316), is identified and examined. In one embodiment of the invention, the backup discovery log may be maintained in a client backup record for the given client device, which may be identified using the above-mentioned client device name associated with the given client device. Further, examination of the backup discovery log may result in obtaining a last transaction identifier recorded therein. The last transaction identifier may refer to a numerical value (e.g., an integer) assigned to, and therefore uniquely identifies, a last asset backup operation (which had been instigated on the given client device) for which associated backup operation metadata had been ingested and/or processed by the client device manager.

In Step 320, a discovery configuration object (described above) (see e.g., FIG. 1C), maintained on the client device manager, is examined. In one embodiment of the invention, examination of the discovery configuration object may result in the identification of a resource-based ingestion flag specified therein. The resource-based ingestion flag may reference a user-defined parameter, which may reflect a Boolean (i.e., true or false) value indicative of whether the client device manager should limit the ingestion or processing of breadcrumb object backup operation metadata, deliverable by the client device(s), based on a current utilization or availability of resources (e.g., computer processor(s) and/or memory) on the client device manager.

In Step 322, a determination is made as to whether the resource-based ingestion flag (identified in Step 320) is enabled—e.g., reflects a TRUE Boolean value. Accordingly, in one embodiment of the invention, if it is determined that the resource-based ingestion flag is enabled, then the process proceeds to Step 330 (see e.g., FIG. 3B). On the other hand, in another embodiment of the invention, if it is alternatively determined that the resource-based ingestion flag is disabled—e.g., reflects a FALSE Boolean value—then the process alternatively proceeds to Step 334 (see e.g., FIG. 3B).

Turning to FIG. 3B, in Step 330, upon determining (in Step 322) that the resource-based ingestion flag (identified in Step 320) is enabled, a breadcrumb paging value is derived. In one embodiment of the invention, derivation of the breadcrumb paging value (described above) (see e.g., FIG. 1C) may be based on the current and/or forecasted future utilization (or availability) of one or more client device manager resources (e.g., computer processors and/or memory).

In Step 332, a backup discovery request is issued. In one embodiment of the invention, the backup discovery request may be directed to the given client device (identified in Step 316) and may include the last transaction identifier (obtained in Step 318) and the breadcrumb paging value (derived in Step 330). Further, the backup discovery request may pertain to instigating a backup discovery operation targeting the given client device. Hereinafter, the process proceeds to Step 336.

In Step 334, upon alternatively determining (in Step 322) that the resource-based ingestion flag (identified in Step 320) is disabled, a backup discovery request is issued. In one embodiment of the invention, the backup discovery request may be directed to the given client device (identified in Step 316) and may include the last transaction identifier (obtained in Step 318). Further, the backup discovery request may pertain to instigating a backup discovery operation targeting the given client device.

In Step 336, following the issuance of the backup discovery request (either in Step 332 or Step 334), a discovery batch response is received from the given client device (identified in Step 316) in response to the backup discovery request issued thereto. In one embodiment of the invention, the discovery batch response may include backup operation metadata (described above) (see e.g., FIG. 1B) that had been recorded in one or more breadcrumb objects maintained on the given client device.

In Step 338, the backup operation metadata (received in Step 336) is processed. In one embodiment of the invention, processing (i.e., examination) of the backup operation metadata may result in obtaining one or more backup operation request statuses detailing the current state of one or more asset backup operations, respectively, which had been instigated on the given client device. Further, processing of the backup operation metadata may also result in identifying a new last transaction identifier.

In Step 340, the backup discovery log (examined in Step 318), for the given client device (identified in Step 316), is updated. Specifically, in one embodiment of the invention, updating the backup discovery log may entail amending at least a portion of the existing set of backup operation request statuses detailed therein using the backup operation request status(es) (obtained in Step 338). Further, updating the backup discovery log may also entail replacing the existing last transaction identifier recorded therein with the new last transaction identifier (also obtained in Step 338).

In Step 342, a determination is made as to whether additional discovery batch responses, tied to the backup discovery request (issued in Step 332 or Step 334), are expected. That is, multiple discovery batch responses may be tied to a single backup discovery request in scenarios whereby the total cardinality of breadcrumb objects, identified during a backup discovery operation, exceeds a breadcrumb paging value, which limits the number of breadcrumb objects (or rather, backup operation metadata stored in the breadcrumb objects) that may be ingested and/or processed by the client device manager at any given time. Accordingly, in one embodiment of the invention, if it is determined that at least one other discovery batch response, tied to the above-issued backup discovery request, is expected, then the process proceeds to Step 344. On the other hand, in another embodiment of the invention, if it is alternatively determined that no more discovery batch responses, tied to the above-issued backup discovery request, are expected, then the process alternatively ends.

In Step 344, upon determining (in Step 342) that at least one other discovery batch response, tied to the backup discovery request (issued in Step 332 or Step 334), is expected, other tasks (for which the client device manager may be responsible) are performed until a next discovery batch response is received.

Figure 4:
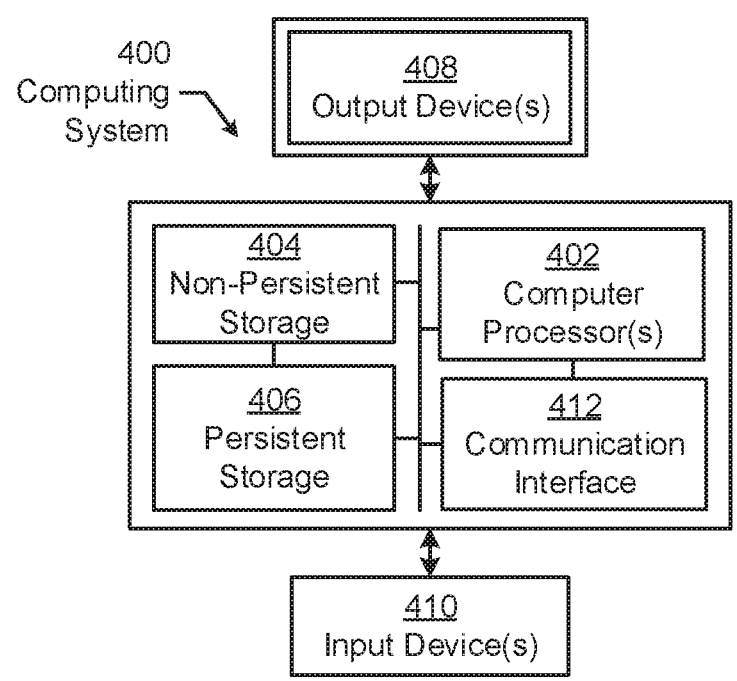
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for handling backup discovery operations, comprising:
   receiving, from a client device manager, a first backup discovery request comprising a first last transaction identifier and a first breadcrumb paging value;
   identifying, based on the first last transaction identifier, a first breadcrumb object set comprising a first plurality of breadcrumb objects;
   partitioning, based on the first breadcrumb paging value, the first breadcrumb object set to obtain a first breadcrumb object subset comprising a portion of the first plurality of breadcrumb objects;
   generating a first discovery batch response comprising backup operation metadata retrieved from the first breadcrumb object subset; and
   transmitting, in response to the first backup discovery request, the first discovery batch response to the client device manager.

2. The method of claim 1, wherein a transaction identifier associated with each breadcrumb object of the first plurality of breadcrumb objects reflects a numerical value greater than another numerical value representative of the first last transaction identifier.

3. The method of claim 1, wherein a cardinality of the first breadcrumb object subset is one selected from a group consisting of less than and equal to, a numerical value representative of the first breadcrumb paging value.

4. The method of claim 1, wherein the backup operation metadata comprises a transaction identifier associated with each breadcrumb object of the portion of the first plurality of breadcrumb objects.

5. The method of claim 4, wherein the backup operation metadata further comprises a status recorded for an asset backup operation associated with each breadcrumb object of the portion of the first plurality of breadcrumb objects.

6. The method of claim 1, wherein partitioning of the first breadcrumb object set further obtains a second breadcrumb object subset comprising another portion of the first plurality of breadcrumb objects.

7. The method of claim 6, further comprising:
   generating a second discovery batch response comprising backup operation metadata retrieved from the second breadcrumb object subset; and
   transmitting, in response to the first backup discovery request, the second discovery batch response to the client device manager.

8. The method of claim 1, further comprising:
   prior to receiving the first backup discovery request:
      receiving, from the client device manager, a first backup operation request comprising a first asset name associated with a first asset;
      performing a first asset backup operation targeting the first asset to obtain a first breadcrumb object of the first plurality of breadcrumb objects;
      receiving, from the client device manager, a second backup operation request comprising a second asset name associated with a second asset; and
      performing a second asset backup operation targeting the second asset to obtain a second breadcrumb object of the first plurality of breadcrumb objects.

9. The method of claim 8, wherein the first breadcrumb object comprises a first transaction identifier assigned to the first asset backup operation and the second breadcrumb object comprises a second transaction identifier assigned to the second asset backup operation.

10. The method of claim 1, further comprising:
    receiving, from the client device manager, a second backup discovery request comprising a second last transaction identifier and excluding the first breadcrumb paging value;
    obtaining, based on the second backup discovery request excluding the first breadcrumb paging value, a second breadcrumb paging value stored in a discovery configuration object;
    identifying, based on the second last transaction identifier, a second breadcrumb object set comprising a second plurality of breadcrumb objects;
    partitioning, based on the second breadcrumb paging value, the second breadcrumb object set to obtain a second breadcrumb object subset comprising a portion of the second plurality of breadcrumb objects;
    generating a second discovery batch response comprising backup operation metadata retrieved from the second breadcrumb object subset; and
    transmitting, in response to the second backup discovery request, the second discovery batch response to the client device manager.

11. The method of claim 10, wherein partitioning of the second breadcrumb object set further obtains a third breadcrumb object subset comprising another portion of the second plurality of breadcrumb objects.

12. A non-transitory computer readable medium (CRM) comprising computer readable program code, which when executed by a computer processor, enables the computer processor to:
    receive, from a client device manager, a first backup discovery request comprising a first last transaction identifier and a first breadcrumb paging value;
    identify, based on the first last transaction identifier, a first breadcrumb object set comprising a first plurality of breadcrumb objects;
    partition, based on the first breadcrumb paging value, the first breadcrumb object set to obtain a first breadcrumb object subset comprising a portion of the first plurality of breadcrumb objects;

generate a first discovery batch response comprising backup operation metadata retrieved from the first breadcrumb object subset; and transmit, in response to the first backup discovery request, the first discovery batch response to the client device manager.

13. The non-transitory CRM of claim 12, wherein a transaction identifier associated with each breadcrumb object of the first plurality of breadcrumb objects reflects a numerical value greater than another numerical value representative of the first last transaction identifier.

14. The non-transitory CRM of claim 12, wherein a cardinality of the first breadcrumb object subset is one selected from a group consisting of less than and equal to, a numerical value representative of the first breadcrumb paging value.

15. The non-transitory CRM of claim 12, wherein the backup operation metadata comprises a transaction identifier associated with each breadcrumb object of the portion of the first plurality of breadcrumb objects.

16. The non-transitory CRM of claim 15, wherein the backup operation metadata further comprises a status recorded for an asset backup operation associated with each breadcrumb object of the portion of the first plurality of breadcrumb objects.

17. The non-transitory CRM of claim 12, wherein partitioning of the first breadcrumb object set further obtains a second breadcrumb object subset comprising another portion of the first plurality of breadcrumb objects.

18. The non-transitory CRM of claim 17, comprising computer readable program code, which when executed by the computer processor, further enables the computer processor to:

generate a second discovery batch response comprising backup operation metadata retrieved from the second breadcrumb object subset; and transmit, in response to the first backup discovery request, the second discovery batch response to the client device manager.

19. The non-transitory CRM of claim 12, comprising computer readable program code, which when executed by the computer processor, further enables the computer processor to:

receive, from the client device manager, a second backup discovery request comprising a second last transaction identifier and excluding the first breadcrumb paging value;

obtain, based on the second backup discovery request excluding the first breadcrumb paging value, a second breadcrumb paging value stored in a discovery configuration object;

identify, based on the second last transaction identifier, a second breadcrumb object set comprising a second plurality of breadcrumb objects;

partition, based on the second breadcrumb paging value, the second breadcrumb object set to obtain a second breadcrumb object subset comprising a portion of the second plurality of breadcrumb objects;

generate a second discovery batch response comprising backup operation metadata retrieved from the second breadcrumb object subset; and transmit, in response to the second backup discovery request, the second discovery batch response to the client device manager.

20. A system, comprising:

a client device manager comprising a first computer processor;

a client device operatively connected to the client device manager and comprising a second computer processor; and a backup agent executing on the second computer processor and maintaining at least a plurality of breadcrumb objects, wherein the backup agent is programmed to:

receive, from the client device manager, a backup discovery request comprising a last transaction identifier and a breadcrumb paging value;

identify, based on the last transaction identifier, a breadcrumb object set comprising the plurality of breadcrumb objects;

partition, based on the breadcrumb paging value, the breadcrumb object set to obtain a breadcrumb object subset comprising a portion of the plurality of breadcrumb objects;

generate a discovery batch response comprising backup operation metadata retrieved from the breadcrumb object subset; and transmit, in response to the backup discovery request, the discovery batch response to the client device manager.

* * * * *